(12) United States Patent  (10) Patent No.: US 9,378,571 B1
Jones et al.  (45) Date of Patent: Jun. 28, 2016

(54) BROWSING LARGE GEOCODED DATASETS USING NESTED SHAPES

(75) Inventors: Michael Timothy Jones, Los Altos, CA (US); Amin Pyarali Charaniya, Milpitas, CA (US)

(73) Assignee: Google Inc., Mountain View, CA (US)

( * ) Notice: Subject to any disclaimer, the term of this patent is extended or adjusted under 35 U.S.C. 154(b) by 1568 days.

(21) Appl. No.: 12/129,501

(22) Filed: May 29, 2008

Related U.S. Application Data

(60) Provisional application No. 60/940,695, filed on May 29, 2007.

(51) Int. Cl.
*G09G 5/00* (2006.01)
*G06T 11/60* (2006.01)

(52) U.S. Cl.
CPC ...................... *G06T 11/60* (2013.01)

(58) Field of Classification Search
USPC .......................................................... 345/619
See application file for complete search history.

(56) References Cited

U.S. PATENT DOCUMENTS

| | | | |
|---|---|---|---|
| 5,638,523 A * | 6/1997 | Mullet et al. .................. | 715/855 |
| 6,343,290 B1 * | 1/2002 | Cossins et al. | |
| 7,336,279 B1 * | 2/2008 | Takiguchi ..................... | 345/473 |
| 7,447,509 B2 * | 11/2008 | Cossins et al. ................. | 455/457 |
| 7,707,140 B2 * | 4/2010 | Leishman et al. ..... | 707/999.003 |
| 2002/0080180 A1 | 6/2002 | Mander et al. | |
| 2003/0033273 A1 * | 2/2003 | Wyse ............................... | 707/1 |
| 2003/0182052 A1 * | 9/2003 | DeLorme et al. ............. | 701/201 |
| 2004/0073538 A1 * | 4/2004 | Leishman et al. ................ | 707/3 |
| 2004/0243306 A1 | 12/2004 | Han | |
| 2004/0260720 A1 * | 12/2004 | Cossins et al. ................ | 707/102 |
| 2004/0261038 A1 | 12/2004 | Ording et al. | |
| 2005/0004944 A1 * | 1/2005 | Cossins et al. ............. | 707/104.1 |
| 2005/0004945 A1 * | 1/2005 | Cossins et al. ............. | 707/104.1 |
| 2007/0115373 A1 * | 5/2007 | Gallagher et al. ......... | 348/231.3 |

OTHER PUBLICATIONS

Snavely et al., Photo Toursim: exploring photo collections in 3D, ACM Transactions on Graphics (TOG)—Proceeding of ACM SIGGRAPH 2006, vol. 25, issue 3, Jul. 2006, pp. 835-846.*

Kwan, M.P., "Interactive Geovisualization of Activity-Travel Patterns Using Three-Dimensional Geographical Information Systems: A Methodological Exploration with a Large Data Set," *Transportation Research Part C: Emerging Technologies*, Feb. 2000; pp. 185-203.

Konigsberg, S., et al., "The Geospatial Distribution of Employment: Examples from the Bureau of Labor Statistics Quarterly Census of Employment and Wages Program," *Division of Administrative Statistics and Labor Turnover—Office of Employment and Unemployment Statistics—Bureau of Labor Statistics*, Published in 2005; 9 pages.

* cited by examiner

*Primary Examiner* — M Good Johnson
(74) *Attorney, Agent, or Firm* — Dority & Manning, P.A.

(57) ABSTRACT

A geographic information system and method are disclosed which facilitate the browsing of large geocoded datasets. In a embodiment, a method displays data elements on a map. The method includes the steps: identifying data elements of a dataset that geocode to an area of the map; arranging the data elements into one or more nested shapes; determining a coordinate for the one or more nested shapes; and displaying the one or more nested shapes on the map centered on the coordinate. The coordinate corresponds to the area of the map.

9 Claims, 6 Drawing Sheets

BROWSING LARGE GEOCODED DATASETS USING NESTED SHAPES

This application claims the benefit of U.S. Provisional Appl. No. 60/940,695, filed May 29, 2007, and incorporated by reference herein in its entirety.

FIELD OF THE INVENTION

The present invention relates to geographic information systems and interfaces for browsing large geocoded datasets.

BACKGROUND

Modern geographic information systems such as the Google™ Earth system enable the sophisticated display and analysis of geocoded data. Nevertheless, as the amount of data increases, a simple display of a dataset on a map view with icons represented at geocoded coordinates often creates a cluttered and unusable map interface. It remains a challenge to present the data in a usable interface.

BRIEF SUMMARY OF THE INVENTION

A geographic information system and method are disclosed which facilitate the browsing of large geocoded datasets. In an embodiment, a method displays data elements on a map. The method includes the following steps: identifying data elements of a dataset that geocode to an area of the map; arranging the data elements into one or more nested shapes; determining a coordinate for the one or more nested shapes; and displaying the one or more nested shapes on the map based on the coordinate. The coordinate of the one or more nested shapes corresponds to the area of the map of the data elements.

In another embodiment, a geographic information system displays data elements on a map. The geographic information system includes an area module that identifies data elements of a dataset that geocode to an area of the map. An arranger module arranges the data elements into one or more nested shapes. A coordinate module determines a coordinate for the one or more nested shapes. The coordinate corresponds to the area of the map. A display module displays the one or more nested shapes on the map based on the coordinate.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and to use the invention.

The present invention is described with reference to the accompanying drawings. The drawing in which an element first appears is typically indicated by the leftmost digit or digits in the corresponding reference number.

DETAILED DESCRIPTION OF THE DRAWINGS

Embodiments of the present invention relate to browsing large geocoded data sets. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
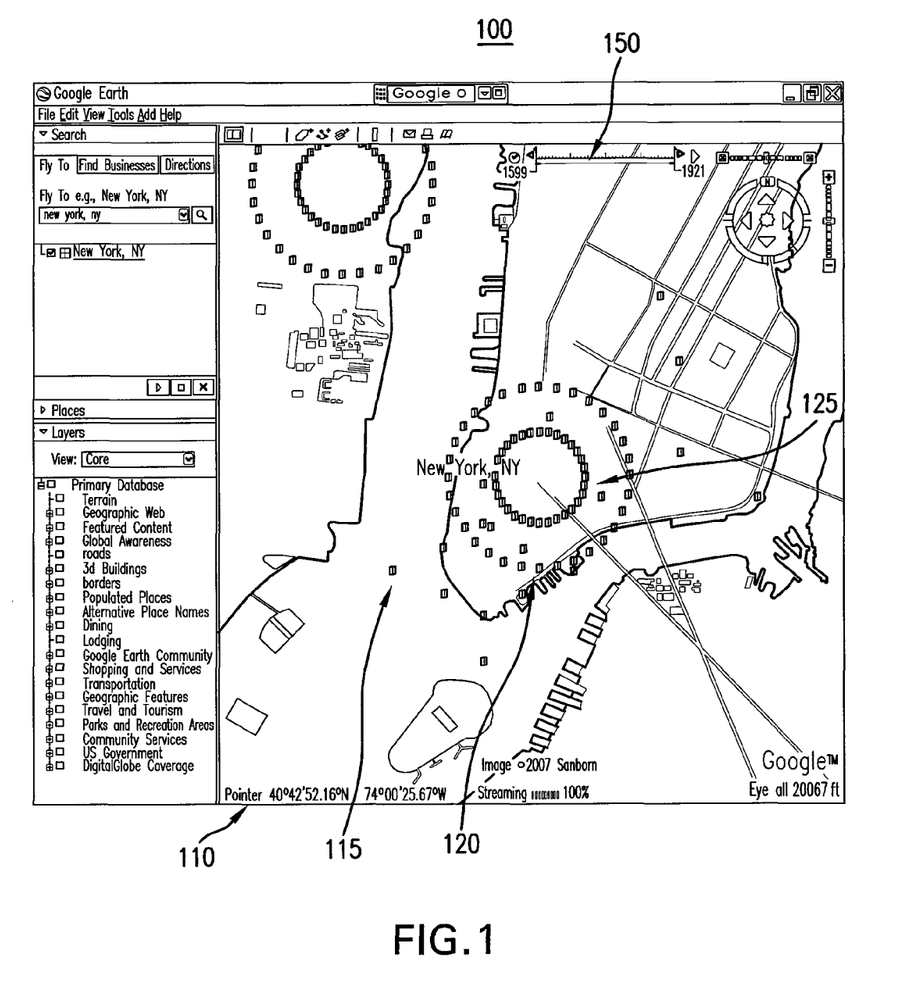
FIG. 1 is an illustrative display of a geographic information system configured in accordance with an embodiment of the present of the invention.

FIG. 1 is an illustrative display of a geographic information system configured in accordance with an embodiment of the present invention. Display 100 is based on the interface available in a Google™ Earth system.

In FIG. 1, display 100 includes a viewport 110 which depicts a map. The map is overlaid with a dataset, configured and arranged in accordance with an embodiment. The data elements in the dataset include geocodes which identify, in some advantageous coding system, coordinates on the map. The geocodes can also include other information, such as a temporal parameter or some other useful parameter. Where a small number of data elements in the dataset geocode to roughly the same coordinates on the map, based on the current map view represented in the viewport, the data elements can be represented by one or more icons located by the mapping system at the relevant coordinates on the map as specified by the geocodes. This is illustrated in FIG. 1, for example, by the icon depicted at 115 in viewport 110. Where a large number of data elements in the dataset geocode to roughly the same coordinates on the map, however, the mapping system is configured so as to arrange the representation of the data elements differently. The mapping system instead arranges the data elements in a regular shape which surrounds the geocoded coordinates. The example illustrated by FIG. 1 is a ring 120 of data element icons which approximately encircle the geocoded coordinates assigned to the data elements.

The visual representation of the data elements instantly provides the user with a sense of the general coordinates assigned to the data elements while also providing the user with a sense of the general number of data elements, based on the density of the data element icons arranged in the ring.

The representation of the data elements is not limited to a single regular shape, but, as illustrated by FIG. 1, can include an arrangement of nested shapes. In FIG. 1, the data elements are arranged in two concentric rings 120 and 125. The data elements in the plurality of rings 120 and 125 belong to the same set of data elements which roughly geocode to the same general region of the map. The data elements, however, have been advantageously segregated into a plurality of sets, as represented by rings 120 and 125. The grouping of the data elements into the two or more nested shapes can be based on any number of factors relevant to the dataset. For example and without limitation, where the dataset represents results from some form of search request, the different nested shapes can represent relative rankings of the data elements in the dataset, e.g., as clustered by some form of relevance score.

It should be noted that the disclosed browsing interface is not limited to any particular type of dataset or map. It is readily applicable to any type of geocoded dataset and to any type of map display.

The example displayed in FIG. 1 uses a dataset comprised of books published between 1599 and 1921 that include some reference in the text of the book to a location. The textual reference to the location can range from the general (e.g., a general reference to New York) to the very specific (e.g., a specific address in New York City). The textual locations have been geocoded so that each book is assigned a set of coordinates on the map, which, in the view selected in FIG. 1, includes portions of New York City and New Jersey. A large number of the books include a general reference to "New York, N.Y.," which arbitrarily geocodes to a general point near the bottom of Manhattan on the map, as indicated by the text reference depicted in FIG. 1. Also, a subset of the dataset geocodes to more precise coordinates which are near the general point selected for New York, N.Y. Rather than displaying these sets of data elements in a clumsy pile of overlapping points/icons, the display in FIG. 1 represents the portion of the dataset which geocodes to coordinates near the central coordinate near the bottom of Manhattan as concentric circles 120 and 125 of icons, each icon representing a data element. If the number of data elements in the group exceeds a readily viewable number, additional circles can be added, or a representative selection of data elements can be displayed. Data elements with coordinates which are further from the central coordinate of circles 120 and 125 can still be represented at their correct geocoded coordinates, as illustrated in FIG. 1.

As a user selects the icon associated with the data element, more information can be provided regarding the data element. For example, if the user hovers a pointer over the icon, a short textual label can be displayed near the icon, and, if the user actively selects the icon with the pointer, a more detailed representation of the information associated with the data element can be provided, for example, in the form of the information balloon depicted in FIG. 5.

The dataset depicted in FIG. 1 is parameterized by the year of publication. The display representation, accordingly, includes an interface 150 for filtering the dataset based on the parameter. The interface 150 in FIG. 1 includes a slider which can be used to select a range of publication dates. The representation of the data elements can then be changed to reflect the selected publication dates.

Figure 2:
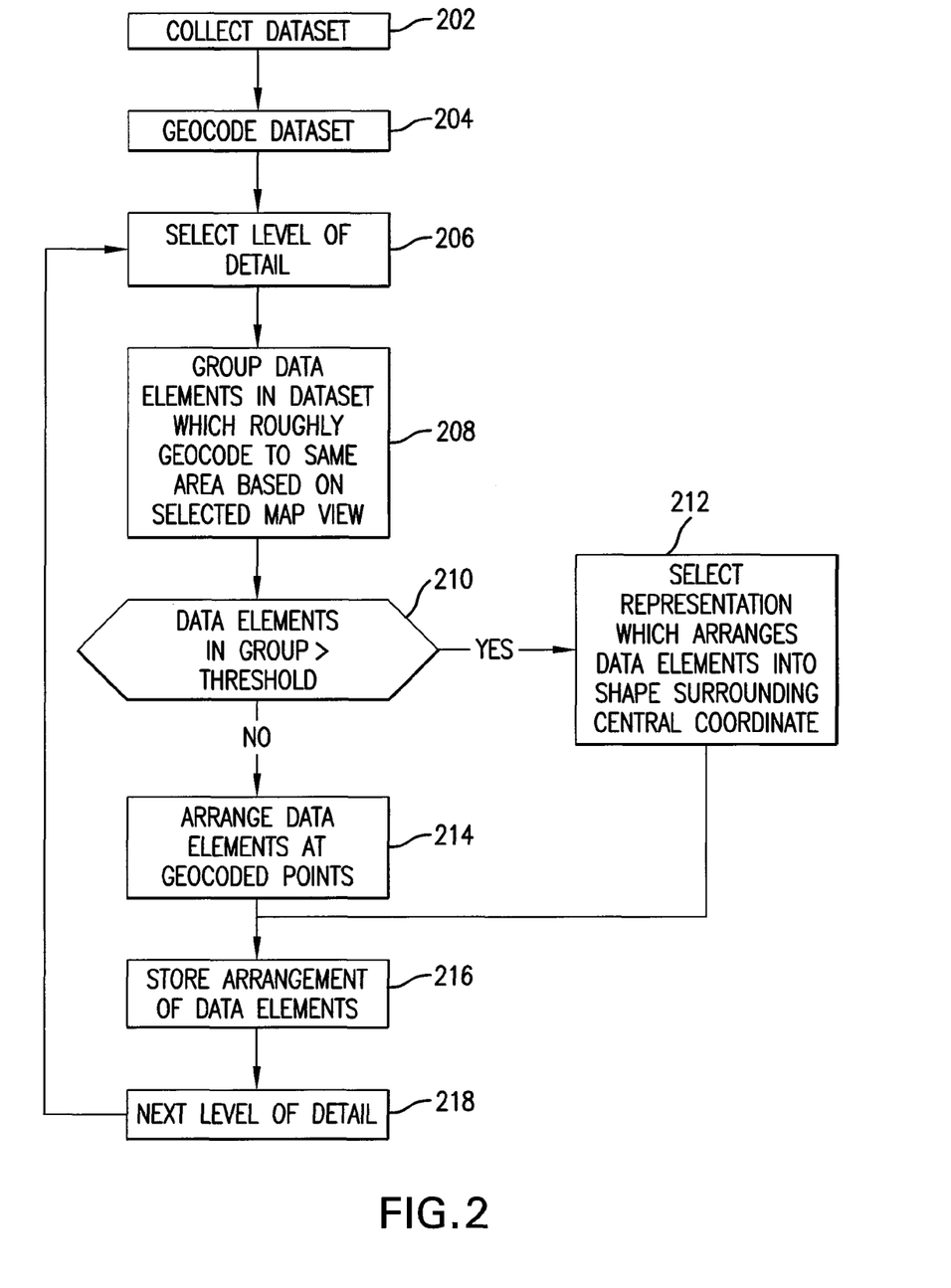
FIG. 2 is a flowchart of processing performed in generating the display representation of the data elements in the dataset according to an embodiment of the present invention.

FIG. 2 is a flowchart of processing performed in generating the display representation of the data elements in the dataset. At step 202, the dataset is collected, and if necessary, the dataset is geocoded at step 204. At step 206, a particular level of detail is selected, representing a view on the map which causes the dataset to be active and rendered in the viewport.

At step 208, the data elements in the dataset are identified which roughly geocode to the same area of the map based on the approximate selected map view. These data elements are grouped. If the number of data elements in the group is greater than some threshold number, at step 210, then a display representation is selected which arranges the data elements into one or more nested shapes. The shapes surround a central coordinate which can be selected based on the geocoded coordinate of the majority of the data elements in the group or based on some other analysis of the coordinates of the data elements in the group. The shapes can be depicted in a flat geometry surrounding the central coordinate or, alternatively, can be represented in a three dimensional manner with different levels of shapes possibly representing different properties of the data elements in the dataset.

For the remaining data elements in the dataset, these data elements are arranged at their geocoded coordinates at step 214. The arrangement of the data elements at steps 212 and 214 is stored at step 216, for example, in an advantageous format such as the Keyhole Markup Language (KML). KML is an XML-based language for representing geographic data.

Then, at step 218, the processing proceeds to another level of detail. Different groups and shapes can be generated for different map views based on the level of detail. Moreover, whether a data element is processed at a particular level of detail can advantageously depend on other aspects of the dataset. For example and without limitation, where the dataset represents results from some form of search request, whether the data element is made part of the presentation or not at the selected level of detail can depend upon some score associated with the data element, e.g., some form of relevance score. Accordingly, the data elements depicted as results from the search request need not be constant. The number of results displayed by the interface can depend on the particular map view and the number/density of other data elements being represented in the viewport. The number of results displayed by the interface can also depend on the relative importance of the different data elements, as reflected by any relevant metric of importance.

It should be noted that the steps in FIG. 2 can be preprocessed and stored for later usage or can be performed by a geographic information system (GIS) as a user is browsing the dataset. Accordingly, as the user changes the map view, e.g., by zooming in on an area of the map, the GIS can generate the arrangement of the data elements within the viewport as the viewport is being rendered.

Figure 3:
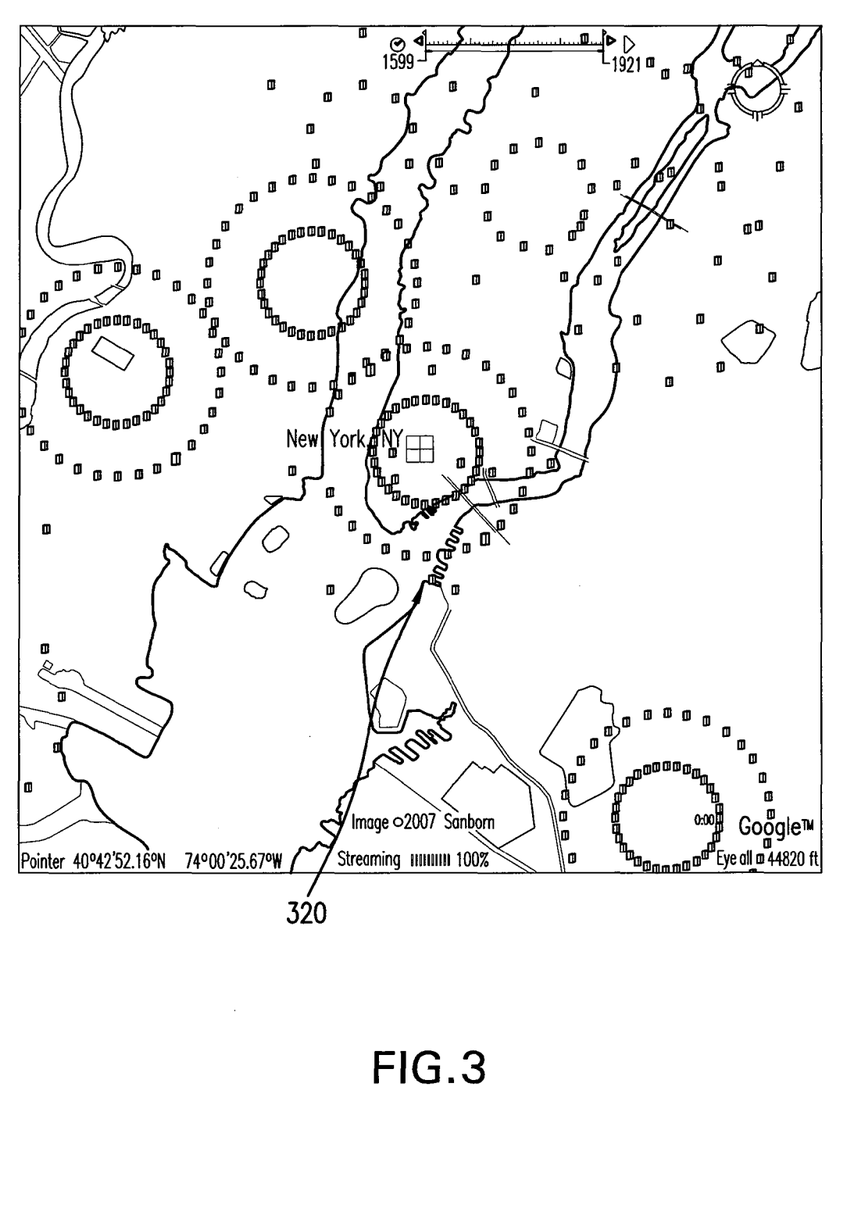
FIG. 3 illustrates how the display of the geographic information system changes as the user zooms out from the display depicted in FIG. 1.
Figure 4:
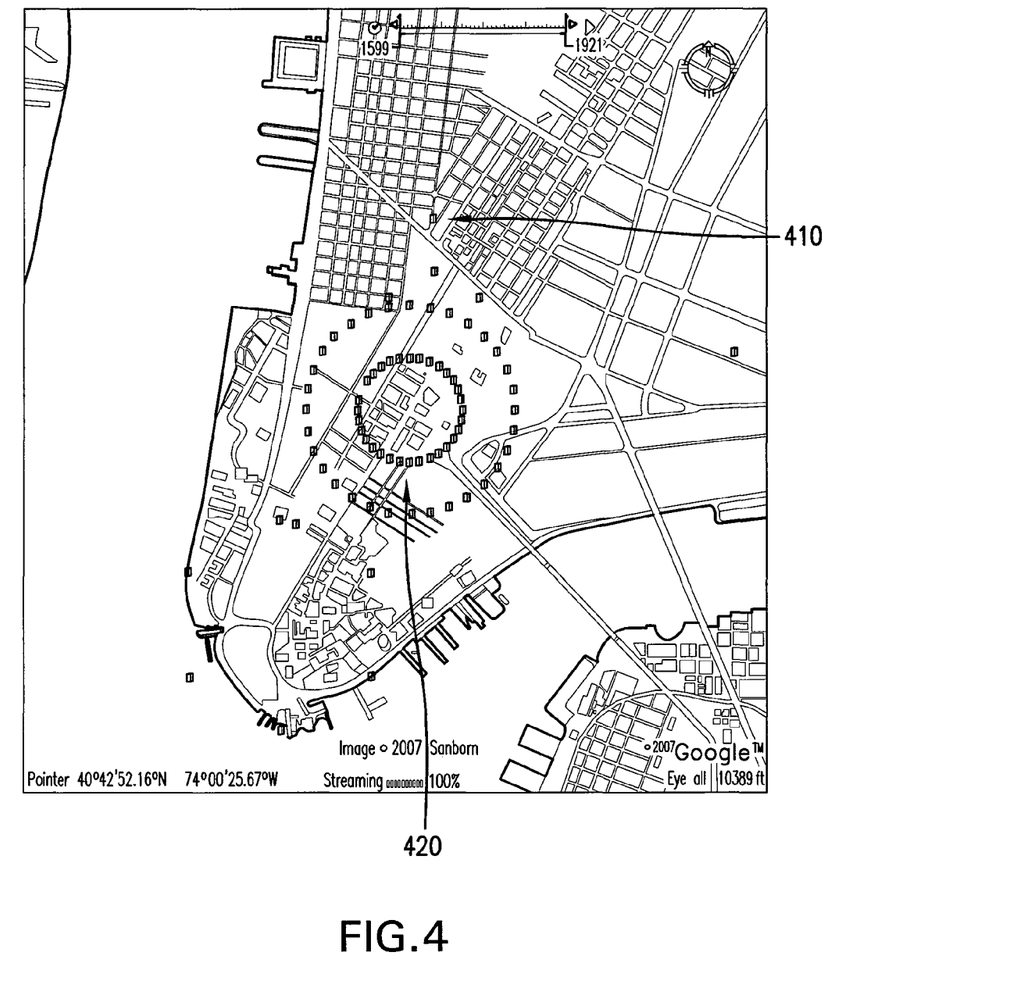
FIG. 4 illustrates how the display of the geographic information system changes as the user zooms into the display depicted in FIG. 1.
Figure 5:
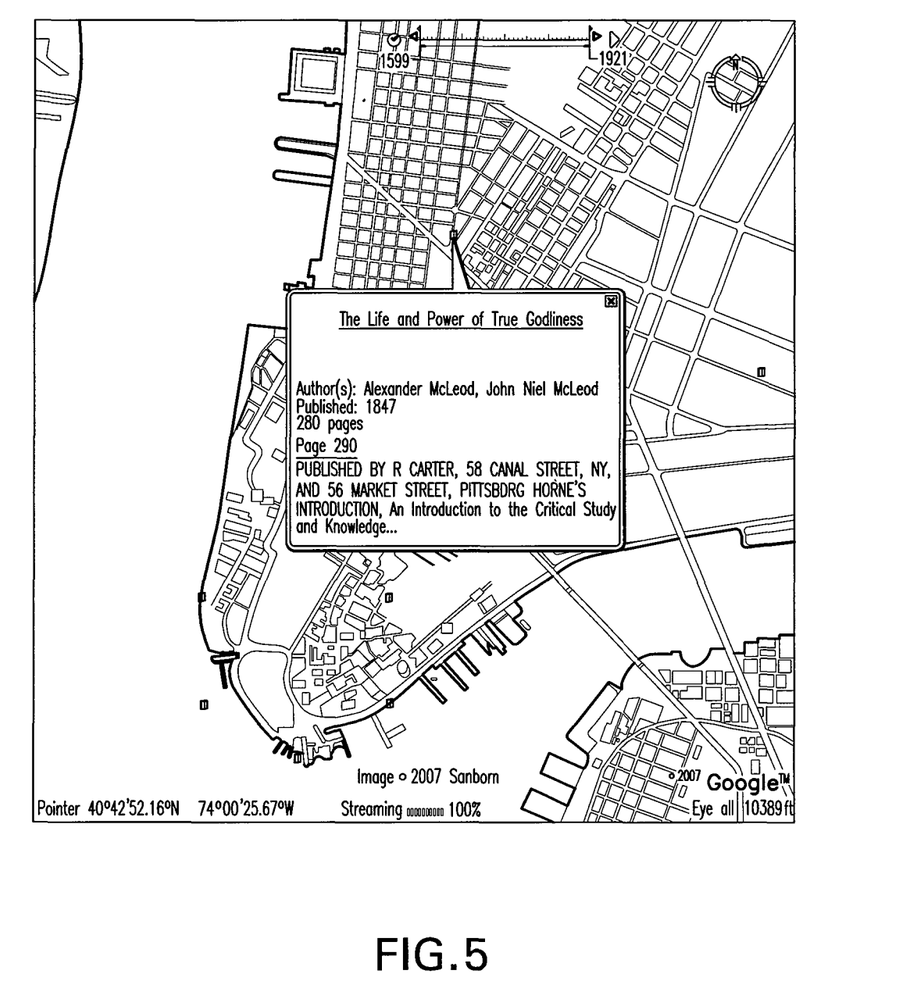
FIG. 5 illustrates how the display in FIG. 4 changes as the user selects an icon representing a data element in the dataset.

FIGS. 3 through 5 illustrate how the display of the geographic information system can change in response to different user interactions, in accordance with an embodiment.

FIG. 3 illustrates how the display of the geographic information system changes as the user zooms out from the display depicted in FIG. 1. As the user zooms out, the GIS recomputes various parameters to ascertain whether to remove or to add data element icons to the display. As depicted in FIG. 3, data elements from the inner circle 125 of FIG. 1 have been incorporated into new circle 320. The level of detail parameter for this representation of the grouped data elements, based on the new map view in the viewport, is no longer sufficient to warrant rendering circle 125 of data elements. Instead, a new outer circle 320 of data elements has been faded in which covers a larger area but is still centered on the same central coordinates. New outer circle 320 of data elements surrounds old outer circle 120 from FIG. 1. Moreover, some of the data elements which previously were represented by individual geocoded coordinates in the map view of FIG. 1 have also been faded out. These data elements have been subsumed by the new circle representations and are now grouped with the data elements arranged in the circles. A similar transition in configuration has occurred with regard to the representation of the data elements surrounding a central coordinate in New Jersey represented in the upper left hand corner of FIG. 1. Moreover, as the viewport zoom level has changed, more areas of the map are now visible and additional data elements and grouped data elements are now visible.

FIG. 4 illustrates how the display of the geographic information system changes as the user zooms into the display depicted in FIG. 1. As the user zooms in, the GIS again recomputes various parameters to ascertain whether to remove or to add data element icons to the display. As depicted in FIG. 4, outer circle 120 of data elements from FIG. 1 has been faded out. The level of detail parameter for this representation of the grouped data elements, based on the new map view in the viewport, is no longer sufficient to warrant rendering circle 120 of data elements. Instead, a new inner circle 420 of data elements has been faded in which covers a smaller area than inner circle 125 in FIG. 1 but is still centered on the same central coordinates. Old inner circle 125 of data elements from FIG. 1 surrounds new inner circle 420. Moreover, some of the data elements which were previously grouped as part of the circular representations in FIG. 1 are now given their own individualized coordinates and icons on the map. This is because the level of detail is now sufficient for these data points to be separately represented in a manner that does not interfere with the other representations of the data elements in the dataset. For example, the icon 410 represents a data element with a location of 58 Canal Street, New York, N.Y. In FIG. 1, the coordinates for 58 Canal Street are grouped with the rest of the coordinates that identify New York, N.Y., and the icon representing the data element is subsumed as part of the circular representations 120 and 125. In FIG. 4, however, the data element is placed at its correct geocoded coordinates and represented separately from the grouped data elements.

FIG. 5 illustrates how the display in FIG. 4 changes as the user selects an icon representing a data element in the dataset. It is assumed that the user has selected icon 410 from FIG. 4. As depicted in FIG. 5, an information balloon window is presented which provides additional information regarding the data element in the dataset, including, for this example, an excerpt of the text in the book mentioning the location.

Figure 6:
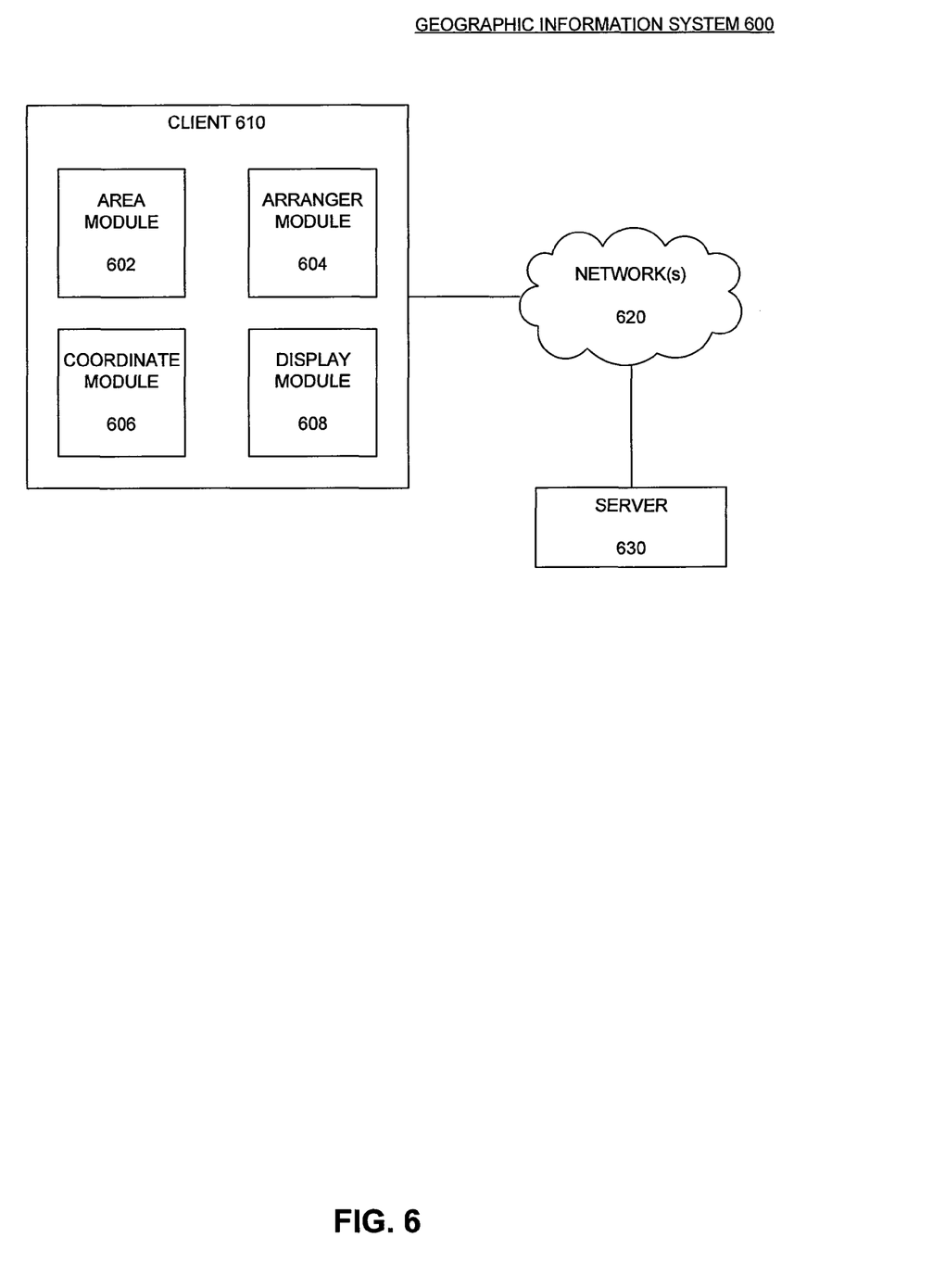
FIG. 6 is an architecture diagram of a geographic information system according to an embodiment of the present invention.

FIG. 6 is an architecture diagram of a geographic information system 600, according to an embodiment of the present invention. Geographic information system 600 includes a client 610 coupled to a server 630 via one or more networks 620, such as the Internet. Geographic information system 600 has a client-server architecture, but this architecture is meant to be merely exemplary. Embodiments of the present invention may be incorporated into any GIS. Other possible GIS architectures include the Digital Mapping System described in U.S. Pat. No. 7,158,878 (incorporated by reference in its entirety herein), and the architecture of a Google™ Earth system, available at http://earth.google.com/.

Client 610 includes an area module 602, an arranger module 604, a coordinate module 606, and a display module 608. Area module 602 identifies data elements of a dataset that geocode to an area of the map. To determine the area, area module 602 may, for example, segment the map. In embodiments, area module 602 may determine the area of map according to a level of detail parameter. As discussed earlier, the level of detail parameter may correspond to the density of data elements in the map. For example, if the data elements are more dense the level of detail parameter may be defined such that the area of the map is larger, and more data elements are incorporated into the nested shapes. In another embodiment, a level of detail parameter may be defined by a zoom level associated with the map. The area of the data elements may be larger if the map is zoomed out and the area may be smaller if the map is zoomed in. GIS 600 may zoom in and out of the map in response to a user input from an input device, such as a keyboard, touchscreen, or mouse. How GIS 600 may respond to zooming in and out of the map is described in detail with respect to FIGS. 3 and 4.

According to a feature, arranger module 604 arranges the data elements into one or more nested shapes. In an embodiment, arranger module 604 may arrange the data elements into one or more concentric circles. For example, arranger module 604 may arrange the data elements into one or more nested shapes as described in detail with respect to FIG. 1.

In another embodiment, arranger module 604 may determine whether a number of data elements in the set of data elements exceeds a threshold. If the number of data elements in the set exceeds a threshold, arranger module 604 may determine one or more sets to further divide the data elements. In one example, the first and second sets are mutually exclusive. Arranger module 604 may arrange the first set into a first nested shape and may arrange the second set into a second nested shape. The second nested shape may be located within the first nested shape. Arranger module 604 may determine whether each data element is in the first set or the second set according to a relevant score of the data element. In one example, the relevant score may be determined according to a page rank or a search score. Arranger module 604 also may determine whether each data element is in the first set or the second set according to a property of the data element.

In examples, the data element may have properties corresponding to a search category, MIME type, file extension, size, creation date or other metadata. These examples are merely illustrative and are not meant to limit the present invention.

In other embodiments, more than two sets and nested shapes may be determined. The sets may be mutually exclusive, and a union of all the sets may include all the data elements in the area.

Coordinate module 606 determines a coordinate for the one or more nested shapes. The coordinate may correspond to the area determined by area module 602. In one example, the coordinate may be the center of the area determined by the area module 602.

Display module 608 displays the one or more nested shapes on the map based on the coordinate. In one example, display module 618 displays each nested shape centered about the coordinate. In an example, display module 618 may be further part of or coupled to a browser to output for display in a browser window. In another example, display module 618 may output data to a buffer for display in GIS 600. Display module 608 may display an icon for each data element in the one or more nested shapes on the map centered on the coordinate. If a user hovers a cursor over an icon for a particular data element, display module 608 may display a short textual message describing the data element. If a user selects an icon for a particular data element, display module 608 may display an information balloon window describing the data element in detail. An information balloon window is described with respect to FIG. 5.

Each of area module 602, arranger module 604, coordinate module 606 and display module 608 may be implemented on hardware, software, firmware or any combination thereof.

To retrieve geographic data including the data elements, client 602 may interact with server 630 via network 620. In one example operation, client 602 may send a query inputted by a user to server 630. Server 630 may conduct a search based on the query and return results, each result including a geocode. The geocoded results are then used by area module 602 to determine the data elements in a particular area. Additionally, client 602 may retrieve map tiles and other geographic data from server 630. These examples are illustrative and are not intended to limit the present invention.

Each of client 602 and server 630 may include any computing device. Such a computing device may include at least one processor and memory and may be able to communicate over a network. Example computing devices, include, but are not limited to, a computer, workstation, distributed computing system, embedded system, stand-alone electronic device, networked device, mobile device, rack server, television, or other type of computer system.

Network(s) 620 can be any network or combination of networks that can carry data communication, and may be referred to herein as a computer network. Such network(s) 620 can include, but is not limited to, a local area network, medium area network, and/or wide area network such as the Internet. Network(s) 620 can support protocols and technology including, but not limited to, World Wide Web protocols and/or services. Intermediate web servers, gateways, or other servers may be provided between components of system 600 depending upon a particular application or environment.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer implemented method for displaying data elements of a data set on a map comprising:
    determining an extent of a geolocated area, wherein the extent of the geolocated area is based on whether graphical representations of the data elements, when displayed at the data elements' respective geocoded position on the map, at least partially overlap;
    identifying, via use of a computer processor, the data elements that geocode within the geolocated area on the map;
    repositioning the graphical representations of the identified data elements from the data elements' respective geolocated positions into a nested shape, each graphical representation making up a portion of the nested shape such that the geographic representations do not overlap when the nested shape is displayed;
    determining a coordinate for the nested shape, wherein the coordinate falls within the geolocated area in (a); and
    displaying the nested shape on the map, wherein the nested shape is centered around the coordinate.

2. The method of claim 1, further comprising determining the geographic area according to a zoom level associated with the map, wherein the geographic area is larger if the map is zoomed out and smaller if the map is zoomed in.

3. The method of claim 1, wherein the repositioning comprises repositioning the graphical representations of the identified data elements into one or more concentric circles.

4. The method of claim 1, wherein the repositioning further comprises:
    (i) determining whether a number of graphical representations of the identified data elements exceeds a threshold;
    (ii) determining a first set and a second set from the graphical representations if the number of graphical representations exceeds a threshold;
    (iii) repositioning the first set into a first nested shape; and
    (iv) repositioning the second set into a second nested shape located within the first nested shape.

5. The method of claim 4, wherein the determining of step (ii) comprises determining whether each graphical representation is in the first set or the second set according to a relevant score of the data element.

6. The method of claim 4, wherein the determining of step (ii) comprises determining whether each graphical representation is in the first set or the second set according to a property of the data element.

7. The method of claim 1, wherein the displaying includes displaying the graphical representation for each identified data element in the nested shape on the map.

8. The method of claim 7, further comprising displaying a textual message describing a particular graphical representation in the nested shape in response to a user input hovering over the graphical representation.

9. The method of claim 7, further comprising displaying an information balloon window describing in detail a particular graphical representation in the nested shape in response to a user input selecting the graphical representation.

* * * * *